United States Patent
Kondo et al.

(10) Patent No.: US 12,240,461 B2
(45) Date of Patent: Mar. 4, 2025

(54) DRIVING SUPPORT APPARATUS

(71) Applicant: TOYOTA JIDOSHA KABUSHIKI KAISHA, Toyota (JP)

(72) Inventors: Kumiko Kondo, Numazu (JP); Shinya Kawamata, Mishima (JP); Shogo Ito, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 18/479,942

(22) Filed: Oct. 3, 2023

(65) Prior Publication Data

US 2024/0132074 A1 Apr. 25, 2024
US 2024/0227809 A9 Jul. 11, 2024

(30) Foreign Application Priority Data

Oct. 25, 2022 (JP) ................................ 2022-170687

(51) Int. Cl.
*B60W 30/18* (2012.01)
*B60W 40/08* (2012.01)

(52) U.S. Cl.
CPC ...... *B60W 30/18109* (2013.01); *B60W 40/08* (2013.01); *B60W 2540/10* (2013.01); *B60W 2540/12* (2013.01)

(58) Field of Classification Search
CPC .......... B60W 30/18109; B60W 40/08; B60W 2540/10; B60W 2540/12
USPC ........................................................ 701/70
See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2017/0080942 A1 | 3/2017 | Nakada |
| 2019/0295419 A1 | 9/2019 | Tosa et al. |

FOREIGN PATENT DOCUMENTS

| | | |
|---|---|---|
| JP | 2017-56880 A | 3/2017 |
| JP | 2022137768 A  * | 9/2022 |

OTHER PUBLICATIONS

JP-2022137768-A (Kota et al.) (Sep. 22, 2022) (Machine Translation) (Year: 2022).*

* cited by examiner

*Primary Examiner* — Mahmoud Gimie
(74) *Attorney, Agent, or Firm* — Sughrue Mion, PLLC

(57) ABSTRACT

The driving support apparatus performs deceleration control of the vehicle. The driving support apparatus includes: a sensitivity setting unit configured to set an actuation sensitivity of a deceleration control; a deceleration execution unit configured to execute the deceleration control based on the actuation sensitivity; and a brake operation detection unit configured to detect a brake operation by a driver. The sensitivity setting unit changes the actuation sensitivity based on a control execution count which is the number of executions of the deceleration control and a driver operation count which is the number of operations of the brake operation.

5 Claims, 6 Drawing Sheets

DRIVING SUPPORT APPARATUS

CROSS-REFERENCE TO RELATED APPLICATIONS

This application is based upon and claims the benefit of priority from Japanese Patent Application No. 2022-170687, filed on Oct. 25, 2022. The entire contents of which are incorporated herein by reference.

TECHNICAL FIELD

The present disclosure relates to a driving support apparatus for performing deceleration control of a vehicle.

BACKGROUND

There is a driving support apparatus that performs deceleration control of a vehicle as driving support for a driver of the vehicle. Such a driving support apparatus is required to perform driving support in accordance with characteristics of a driver. For example, JP2017-156880A describes a driving support apparatus that executes deceleration control during traveling on a curved road based on a driving operation of a driver on a straight road before a curve.

SUMMARY

For example, in a driving support apparatus described in JP2017-156880A, driving support corresponding to characteristics of a driver cannot be performed only by performing deceleration control based on a driving operation before a curved road. Therefore, the present disclosure describes a driving support apparatus capable of performing driving support more suitable for the characteristics of a driver.

One aspect of the present disclosure is a driving support apparatus that performs deceleration control of a vehicle. The driving support apparatus includes a sensitivity setting unit configured to set an actuation sensitivity of a deceleration control, a deceleration execution unit configured to execute the deceleration control based on the actuation sensitivity, and a brake operation detection unit configured to detect a brake operation performed by a driver of a vehicle. The sensitivity setting unit changes the actuation sensitivity based on the control execution count and the driver operation count. The control execution count is the number of executions of the deceleration control by the decrement execution unit. The driver operation count is the number of times of brake operation detected by the brake operation detection unit.

In the driving support apparatus, the sensitivity setting unit may calculate the brake override count based on the execution state of the deceleration control in the deceleration execution unit and the detection result of the brake operation detection unit. The brake override count is the number of times the brake operation is performed by the driver during execution of the deceleration control. The sensitivity setting unit may further change the actuation sensitivity based on the brake override count.

According to an aspect of the present disclosure, it is possible to execute driving support more suitable for characteristics of a driver.

DETAILED DESCRIPTION

In the following description, with reference to the drawings, the same reference numbers are assigned to the same components or to similar components having the same function, and overlapping description is omitted.

First Embodiment

Figure 1:
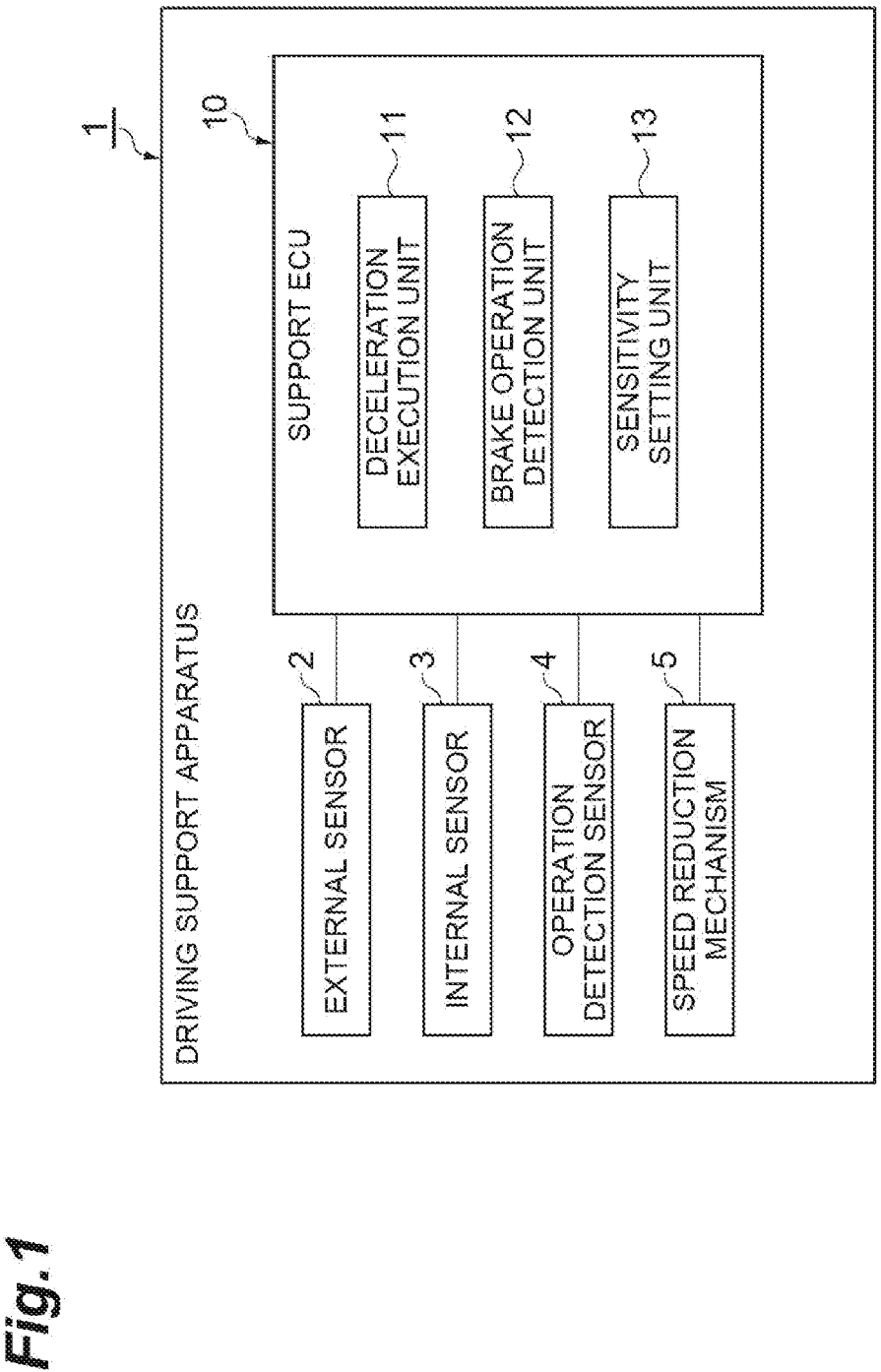
FIG. 1 is a block diagram illustrating an example of a driving support apparatus according to a first embodiment.

First, a first embodiment of the driving support apparatus will be described. A driving support apparatus 1 according to the first embodiment illustrated in FIG. 1 is mounted on a host vehicle and supports a driving operation of a driver who drives the host vehicle. The host vehicle may be simply referred to as a vehicle. The driving support apparatus 1 performs deceleration control of the host vehicle as a support for driving operation. The host vehicle on which the driving support apparatus 1 is mounted is a vehicle capable of controlling deceleration based on at least an instruction of the driving support apparatus 1. The host vehicle may be, for example, an autonomous driving vehicle. The driving support apparatus 1 includes an external sensor 2, an internal sensor 3, an operation detection sensor 4, a speed reduction mechanism 5, and support ECU10 [Electronic Control Unit].

The external sensor 2 is an on-vehicle sensor that detects the external environment of the host vehicle. The external sensor 2 may include, for example, camera, millimeter wave radar, LIDAR [Light Detection and Ranging], and the like. The internal sensor 3 is an on-vehicle sensor that detects a running state of the host vehicle. The internal sensor 3 includes, for example, a vehicle speed sensor that detects vehicle speed of the host vehicle, an acceleration sensor that detects acceleration of the host vehicle, and the like.

The operation detection sensor 4 is an on-vehicle sensor that detects various driving operations by the driver. In the present embodiment, the operation detection sensor 4 includes a brake sensor that detects an operation amount of the brake pedal by the driver. The speed reduction mechanism 5 is a mechanism for realizing deceleration of the host vehicle. The speed reduction mechanism 5 includes at least one of a brake actuator and a drive source, for example. The drive source may be an engine, an electric motor, or the like.

The support ECU10 is an electronic control unit that includes CPU [Central Processing Unit], ROM [Read Only Memory], RAM [Random Access Memory]. The support ECU10 realizes various functions by, for example, loading a program recorded in the ROM into the RAM and executing the program loaded into the RAM by the CPU. The support ECU10 may be composed of a plurality of electronic units. The support ECU10 functionally includes a deceleration execution unit 11, a brake operation detection unit 12, and a sensitivity setting unit 13.

The deceleration execution unit 11 executes deceleration control for decelerating the host vehicle as driving support of the host vehicle. The deceleration execution unit 11 can perform deceleration control based on detection information or the like from the external sensor 2 and the internal sensor 3 as deceleration control. The deceleration execution unit 11 performs a deceleration control by providing instructions to the speed reduction mechanism 5. For example, the deceleration execution unit 11 decelerates the host vehicle by reducing the output of the drive source and/or actuating a brake, etc.

The deceleration execution unit 11 starts to perform the deceleration control based on the set actuation sensitivity. The actuation sensitivity is an actuation timing at which execution of the deceleration control is started. That is, when the deceleration control is necessary, the deceleration execution unit 11 starts the execution of the deceleration control at the actuation timing based on the set actuation sensitivity. The actuation sensitivity is set by the sensitivity setting unit 13. In addition, the actuation sensitivity may be changed by the sensitivity setting unit 13.

The brake operation detection unit 12 detects a brake operation by the driver of the host vehicle. Here, the brake operation detection unit 12 can detect the brake operation by the driver based on the detection information of the operation detection sensor 4.

The sensitivity setting unit 13 sets the actuation sensitivity of the deceleration control performed by the deceleration execution unit 11. The actuation sensitivity may also be changed. In the present embodiment, as the actuation sensitivity, three levels of "early", "middle", and "late" of the actuation timing of the deceleration control are set. Note that the setting of the actuation sensitivity here is an example, and actuation timings of levels other than the three levels may be set.

More specifically, the sensitivity setting unit 13 counts control execution count (Y) and driver operation count (X). The control execution count (Y) is the number of executions of the deceleration control by the deceleration execution unit 11. The driver operation count (X) is the number of brake operations by the driver detected by the brake operation detection unit 12.

Here, when the travel scene of the host vehicle is a predetermined a support operation scene, the sensitivity setting unit 13 counts the control execution count (Y) and the driver operation count (X). If the travel scene of the host vehicle is not the support operation scene, the sensitivity setting unit 13 does not count the control execution count (Y) and the driver operation count (X). The support operation scene is a predetermined scene that is the target of the deceleration control. In other words, the support operation scene is a scene in which there is a possibility that the deceleration execution unit 11 executes deceleration control. Examples of the support operation scene include a case where the inter-vehicle time between the host vehicle and a preceding vehicle is equal to or less than a predetermined threshold value, a case where the host vehicle is traveling on a curved road, and a case where the host vehicle is traveling at a position within a predetermined distance before the traffic light. The sensitivity setting unit 13 may determine whether the scene is the support operation scene based on detection information of the external sensor 2 and the internal sensor 3.

The sensitivity setting unit 13 changes the actuation sensitivity based on the control execution count (Y) and the driver operation count (X), which are counted in the support operation scene. More specifically, the sensitivity setting unit 13 calculates the total number of times (X+Y) of control execution count (Y) and driver operation count (X). When the ratio of the control execution count (Y) to the calculated total number of times (X+Y) is equal to or less than a predetermined first threshold (K1), the sensitivity setting unit 13 changes the actuation sensitivity so that the deceleration control by the deceleration execution unit 11 is easily executed. Here, when the following formula (1) is satisfied, the sensitivity setting unit 13 changes the actuation sensitivity so that the deceleration control is easily executed.

$$Y/(X+Y) \leq K1 \tag{1}$$

Specifically, for example, there is a case where the ratio of the control execution count (Y) to the total number of times (X+Y) is low. In this case, since the operation timing of the deceleration control by the deceleration execution unit 11 is late, it is considered that the ratio of the driver performing the brake operation before the deceleration control by the deceleration execution unit 11 is high. Therefore, the sensitivity setting unit 13 changes the actuation sensitivity so that the deceleration control is easily executed. Here, the sensitivity setting unit 13 increases the actuation sensitivity of the deceleration control so that the deceleration control is easily executed. To increase the actuation sensitivity means to quicken the actuation timing. As a result, the deceleration execution unit 11 can start execution of the deceleration control at a timing according to the characteristics of the driver.

Figure 2:
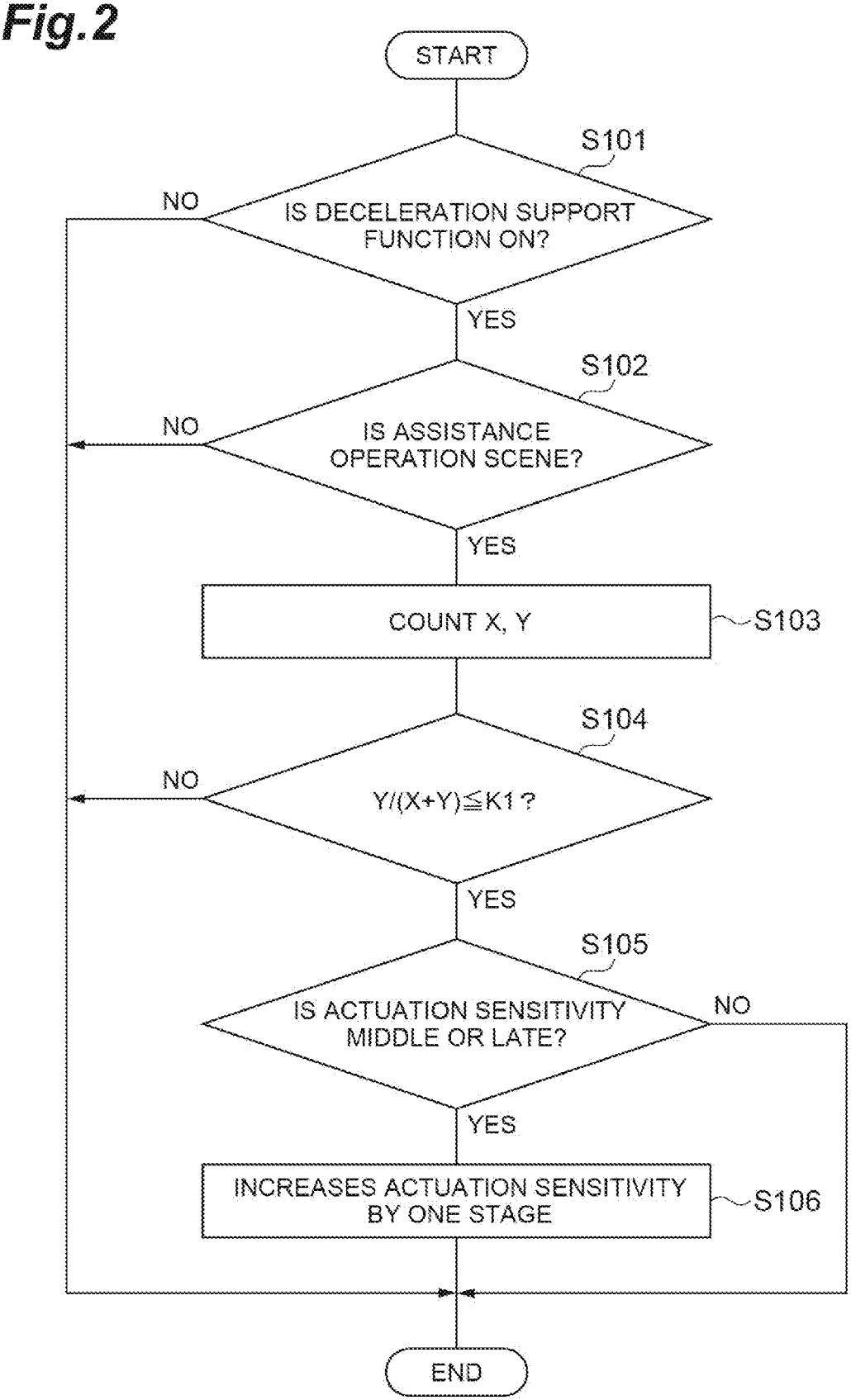
FIG. 2 is a flowchart showing the flow of the process of changing the actuation sensitivity.

Next, a flow of the change processing of the actuation sensitivity performed in the driving support apparatus 1 will be described. In the process shown in FIG. 2, when the process reaches the end, the process is started again from the start after a predetermined time. As illustrated in FIG. 2, the driving support apparatus 1 determines whether the function of the deceleration control by the deceleration execution unit 11 is in an ON state (executable state) (S101). When the function of the deceleration control is in the ON state, the deceleration control can be executed. For example, the execution of the deceleration control by the deceleration execution unit 11 may be set to an OFF state by the operation of the driver or the like. The state in which the execution of the deceleration control is the OFF state is a state in which the execution of the deceleration control is impossible. When the function of the deceleration control is the OFF state (S101: NO), the driving support apparatus 1 starts the processing from the start again after a predetermined time.

When the function of deceleration control is in the ON state (S101: YES), the sensitivity setting unit 13 determines whether or not the travel scene of the host vehicle is the predetermined support operation scene (S102). If the scene is not the support operation scene (S102: NO), the driving support apparatus 1 starts processing again from the start after a predetermined time. If it is the support operation scene (S102: YES), the sensitivity setting unit 13 performs a process of counting the driver operation count (X) and the control execution count (Y) (S103).

Next, in the sensitivity setting unit 13 determines whether the driver operation count (X) and the control execution count (Y) satisfy the above formula (1) "$Y/(X+Y) \leq K1$" (S104). If this formula is not satisfied (S104: NO), the driving support apparatus 1 starts processing again from the start after a predetermined time. On the other hand, if this formula is satisfied (S104: YES), the sensitivity setting unit 13 determines whether the actuation sensitivity is "middle" or "late" (S105).

When the actuation sensitivity is not "middle" or "late" (S105: NO), that is, when the actuation sensitivity is set to "fast", the sensitivity setting unit 13 does not change the actuation sensitivity. Then, the driving support apparatus 1 starts the processing again from the start after a predetermined time.

On the other hand, when the actuation sensitivity is "middle" or "late" (S105: YES), the sensitivity setting unit 13 increases the actuation sensitivity by one level (S106). Raising the actuation sensitivity by one level means advancing the actuation timing by one level. Thereafter, the driving support apparatus 1 starts the process again from the start after a predetermined time. If the actuation sensitivity is changed, the deceleration execution unit 11 performs deceleration control based on the changed actuation sensitivity.

As described above, in the driving support apparatus 1, the actuation sensitivity is changed based on the ratio of the control execution count (Y) to the total number of times (X+Y) of the control execution count (Y) and the driver operation count (X). By performing deceleration control based on this actuation sensitivity, the driving support apparatus 1 can perform driving support more suitable for the characteristics of the driver.

Second Embodiment

Figure 3:
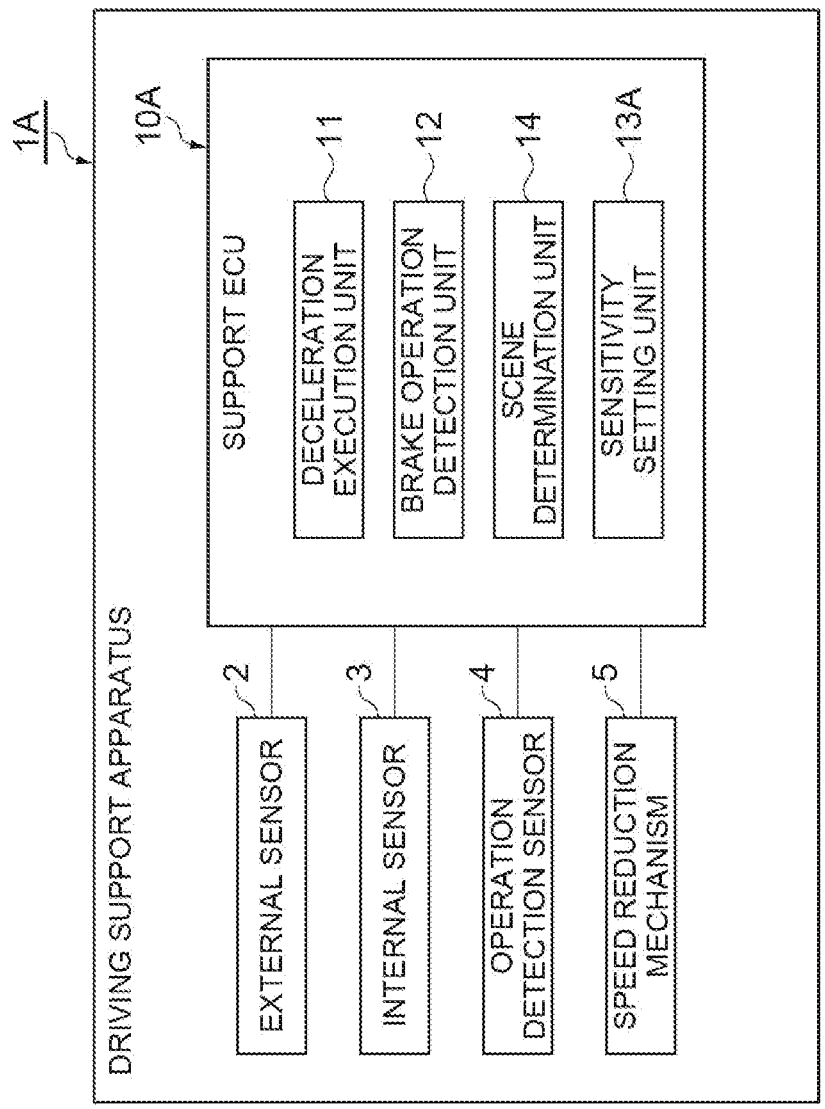
FIG. 3 is a block diagram illustrating an example of a driving support apparatus according to a second embodiment.

Next, a second embodiment of the driving support apparatus will be described. In the following description, portions different from the driving support apparatus 1 according to the first embodiment will be mainly described. Driving support apparatus 1A according to the second embodiment illustrated in FIG. 3 includes a support ECU10A having a different functional configuration instead of the support ECU10 according to the first embodiment. The support ECU10A functionally comprises the deceleration execution unit 11, the brake operation detection unit 12, a scene determination unit 14, and a sensitivity setting unit 13A.

The scene determination unit 14 determines whether it is a brake override necessary scene in which the brake override by the driver is necessary. The brake override necessary scene is a scene in which the brake override operation by the driver is further necessary while the deceleration control by the deceleration execution unit 11 is being executed. The brake override necessary scene is a scene that does not depend on the actuation sensitivity and requires brake override by the driver.

Whether or not the scene determination unit 14 determines the brake override necessary scene can be based on at least one of the traveling state of the host vehicle and the environment around the host vehicle. For example, the brake override necessary scene may be a case where it is necessary to decelerate (stop) the host vehicle at a deceleration larger than the deceleration control by the deceleration execution unit 11.

The sensitivity setting unit 13A calculates a brake override count (W) in addition to the control execution count (Y) and the driver operation count (X) described in the first embodiment. The brake override count (W) is the number of brake overrides performed by the driver while the deceleration control is being executed by the deceleration execution unit 11. The sensitivity setting unit 13A can calculate the brake override count (W) based on the execution state of the deceleration control in the deceleration execution unit 11 and the detection result of the brake operation detection unit 12.

Further, the sensitivity setting unit 13A changes the actuation sensitivity based on the brake override count (W) in addition to the control execution count (Y) and the driver operation count (X) described in the first embodiment. More specifically, the sensitivity setting unit 13A calculates a total brake count (T) which is the total number of times the brake of the host vehicle is operated. The sensitivity setting unit 13A may calculate a total brake count (T) based on the control execution count (Y), the driver operation count (X), and the brake override count (W). Here, the sensitivity setting unit 13A calculates the total brake count (T) by removing the brake override count (W) from the total number of times (X+Y) of the control execution count (Y) and the driver operation count (X). That is, the total brake count (T) is expressed by the following formula (2).

$$T=(X+Y)-B \quad (2)$$

Further, the sensitivity setting unit 13A calculates a necessary scene brake count (a), which is the number of brake overrides performed during the brake override necessary scene. That is, the brake override in the brake override necessary scene is a situation in which the brake operation by the driver is also necessary in addition to the deceleration control by the deceleration execution unit 11, and thus is a case where the deceleration execution unit 11 and the driver perform the brake operation in cooperation with each other.

The brake override may be performed in a scene other than the brake override necessary scene. That is, in this case, although it is determined that the brake override is unnecessary by the driving support apparatus 1, the driver feels that the deceleration is insufficient only by the deceleration control performed by the deceleration execution unit 11. In this case, the driver further performs a brake operation. The number of brake overrides performed in a scene other than the brake override necessary scene is referred to as an unnecessary scene brake count (b). The total number of times (a+b) of the necessary scene brake count (a) and the unnecessary scene brake count (b) is the brake override count (W).

When the ratio of the number (Y−a) obtained by subtracting the necessary scene brake count (a) from the control execution count (Y) to the total brake count (T) is equal to or less than a predetermined second threshold (K2), the sensitivity setting unit 13A changes the actuation sensitivity so that the deceleration control by the deceleration execution unit 11 is easily executed. Here, when the following formula (3) is satisfied, the sensitivity setting unit 13A changes the actuation sensitivity so that the deceleration control is easily executed.

$$(Y-a)/T \leq K2 \quad (3)$$

Here, the sensitivity setting unit 13A increases the actuation sensitivity of the deceleration control (quickens the actuation timing) so that the deceleration control is easily executed. By changing the actuation sensitivity, the control execution count (Y) increases. As a result, the driving support apparatus 1A can suppress that the brake override is performed by the driver in a scene other than the brake override necessary scene. That is, the unnecessary scene brake count (b) is suppressed.

Figure 4:
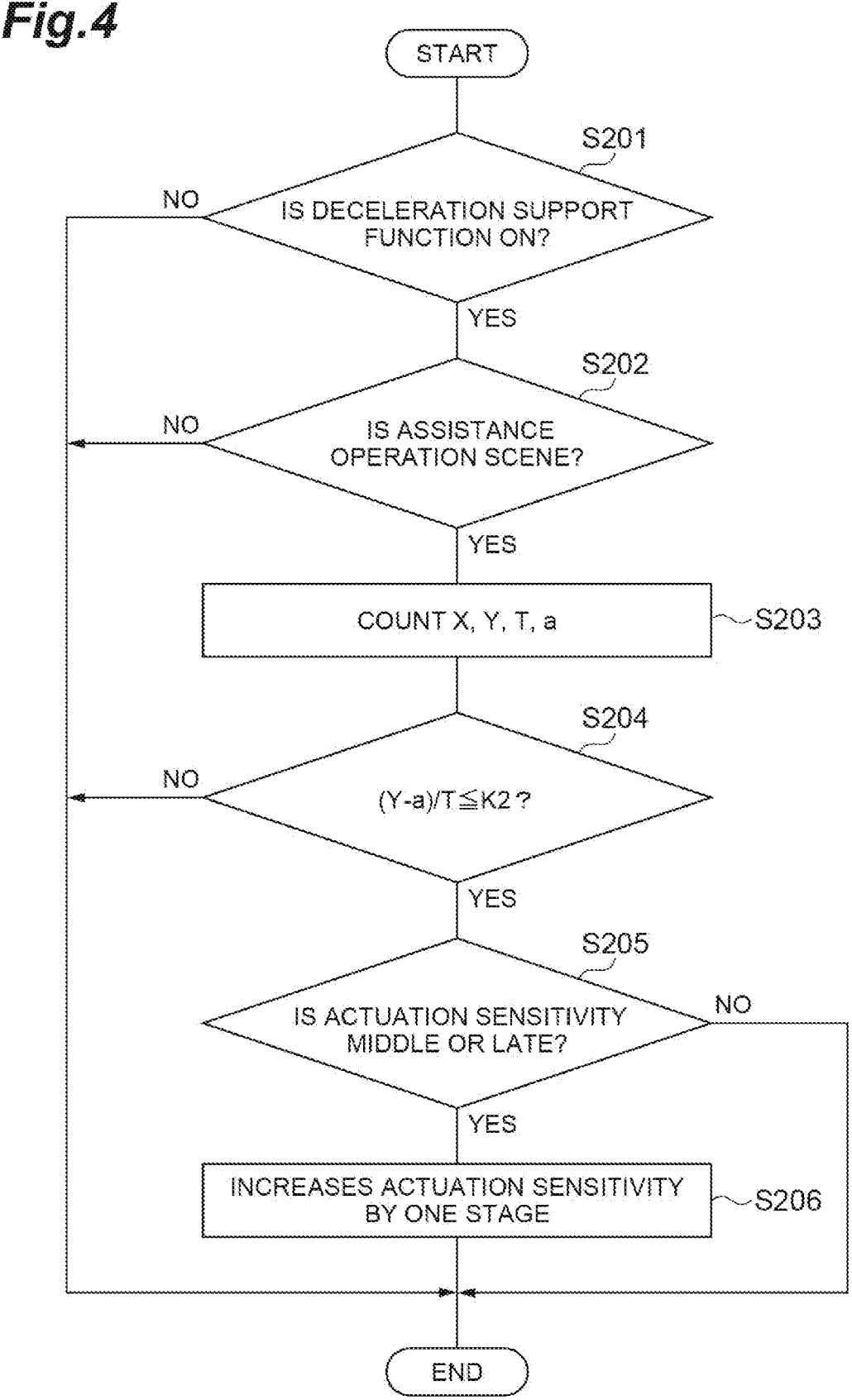
FIG. 4 is a flowchart showing the flow of the process of changing the actuation sensitivity.

Next, a flow of the change processing of the actuation sensitivity performed in the driving support apparatus 1A will be described. In the process shown in FIG. 4, when the process reaches the end, the process is started again from the start after a predetermined time. Here, differences from the flowchart of FIG. 2 will be mainly described. The processing of S201, S202, S205, and S206 shown in FIG. 4 is similar to the processing of S101, S102, S105, and S106 in FIG. 2.

In S203, the sensitivity setting unit 13A calculates the driver operation count (X), the control execution count (Y), the total brake count (T), and the necessary scene brake count (a) (S203). Next, the sensitivity setting unit 13A determines whether or not the calculated control execution count (Y) or the like satisfies the above formula (2) "(Y−a)/T≤K2" (S204). When this formula is satisfied (S204: YES), the sensitivity setting unit 13A performs processing of the S205.

As described above, in the driving support apparatus 1A, the brake override count (W) and the necessary scene brake count (a) are calculated, and the actuation sensitivity is changed using these. Thus, the driving support apparatus 1A can execute driving support more suitable for the characteristics of the driver by executing deceleration control based on the actuation sensitivity.

Third Embodiment

Figure 5:
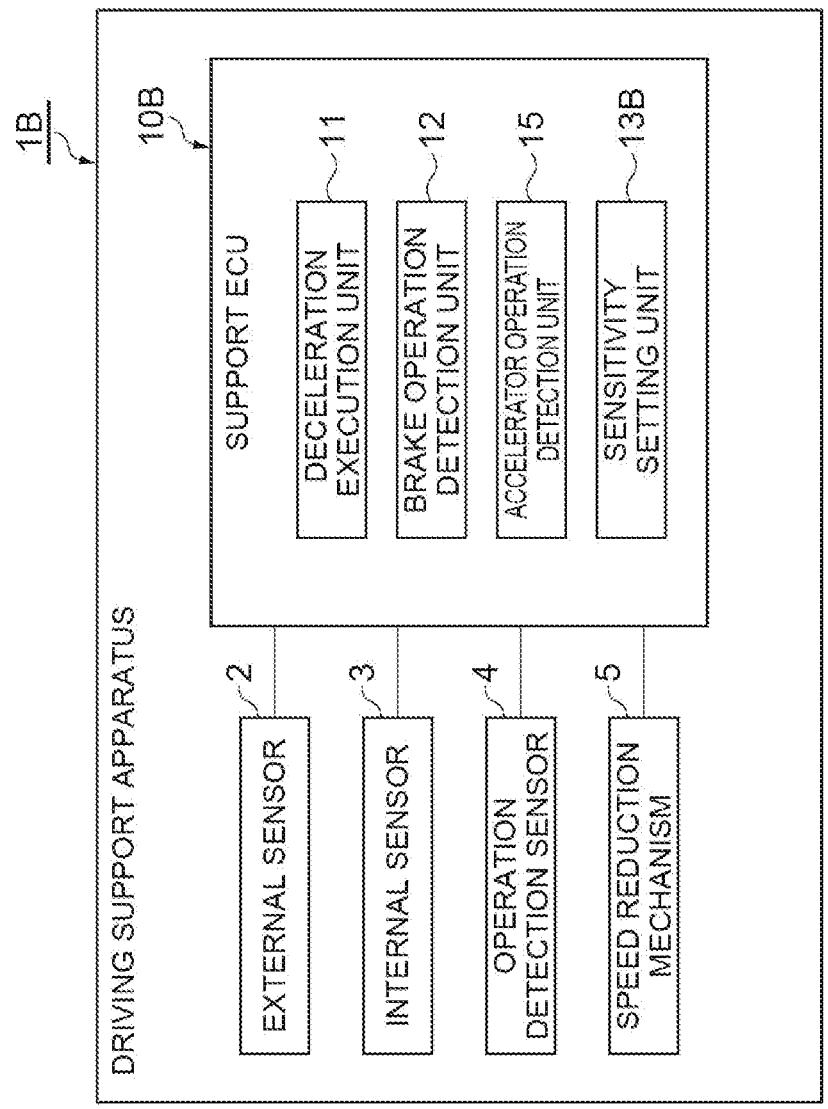
FIG. 5 is a block diagram illustrating an example of a driving support apparatus according to a third embodiment.

Next, a third embodiment of the driving support apparatus will be described. In the following description, portions different from the driving support apparatus 1 according to the first embodiment will be mainly described. Driving support apparatus 1B according to the third embodiment shown in FIG. 5 includes a support ECU10B having a different functional configuration in place of the support ECU10 according to the first embodiment. The support ECU10B functionally comprises the deceleration execution unit 11, the brake operation detection unit 12, an accelerator operation detection unit 15, and a sensitivity setting unit 13B.

The accelerator operation detection unit 15 detects an accelerator operation by a driver of the host vehicle. In the present embodiment, the operation detection sensor 4 further includes an accelerator sensor that detects an operation amount of an accelerator pedal by the driver as an on-vehicle sensor that detects various driving operations by the driver. The accelerator operation detection unit 15 can detect the accelerator operation by the driver based on the detection information of the operation detection sensor 4.

The sensitivity setting unit 13B calculates an accelerator override count (Z) in addition to the control execution count (Y) and the driver operation count (X) described in the first embodiment. The accelerator override count (Z) is the number of accelerator overrides performed by the driver during deceleration control by the deceleration execution unit 11. The sensitivity setting unit 13B may determine the presence or absence of accelerator override based on the execution state of deceleration control by the deceleration execution unit 11 and the detection result of the accelerator operation detection unit 15, and calculate the accelerator override count (Z).

In addition, as described in the first embodiment, the sensitivity setting unit 13B changes the actuation sensitivity based on the control execution count (Y) and the driver operation count (X) so that the deceleration control is easily executed. Further, when the occurrence frequency of accelerator override is high after changing the actuation sensitivity, the sensitivity setting unit 13B returns the actuation sensitivity to the state before the change. More specifically, when the occurrence frequency of accelerator override (accelerator override count (Z)) with respect to the control execution count (Y) increases beyond a predetermined third threshold (K3) before and after the actuation sensitivity is changed so that the deceleration control is easily executed, the sensitivity setting unit 13B returns the actuation sensitivity to the state before the change. Here, when the following formula (4) is satisfied, the sensitivity setting unit 13B returns the changed actuation sensitivity to the state before the change. That is, the sensitivity setting unit 13B lowers the actuation sensitivity by one level. If the following formula (4) is not satisfied, the sensitivity setting unit 13B maintains the changed actuation sensitivity.

$$Z/Y > K3 \tag{4}$$

Note that for example, the sensitivity setting section 13B determines whether or not the occurrence frequency of the accelerator override has increased beyond a predetermined third threshold value (K3) based on the accelerator override count (Z) for a predetermined time after the operation sensitivity has been changed.

Alternatively, for example, the sensitivity setting section 13B determines whether or not the occurrence frequency of accelerator override has increased beyond a predetermined third threshold value (K3) on the basis of the accelerator override count (Z) for a predetermined travel distance after the operation sensitivity has been changed. The sensitivity setting unit 13B may make the determination based on the accelerator override count (Z) calculated based on a predetermined collection criterion other than the predetermined time or the predetermined distances.

Here, when the actuation sensitivity is high, the deceleration control by the deceleration execution unit 11 is easily executed. Therefore, when the occurrence frequency of the accelerator override increases beyond the third threshold (K3) after the change of the actuation sensitivity, the actuation sensitivity is returned to the state before the change. Accordingly, the driving support apparatus 1B can suppress the occurrence of an operation in which the driver cancels the execution of the deceleration control by the deceleration execution unit 11. That is, the occurrence of accelerator override is suppressed.

Figure 6:
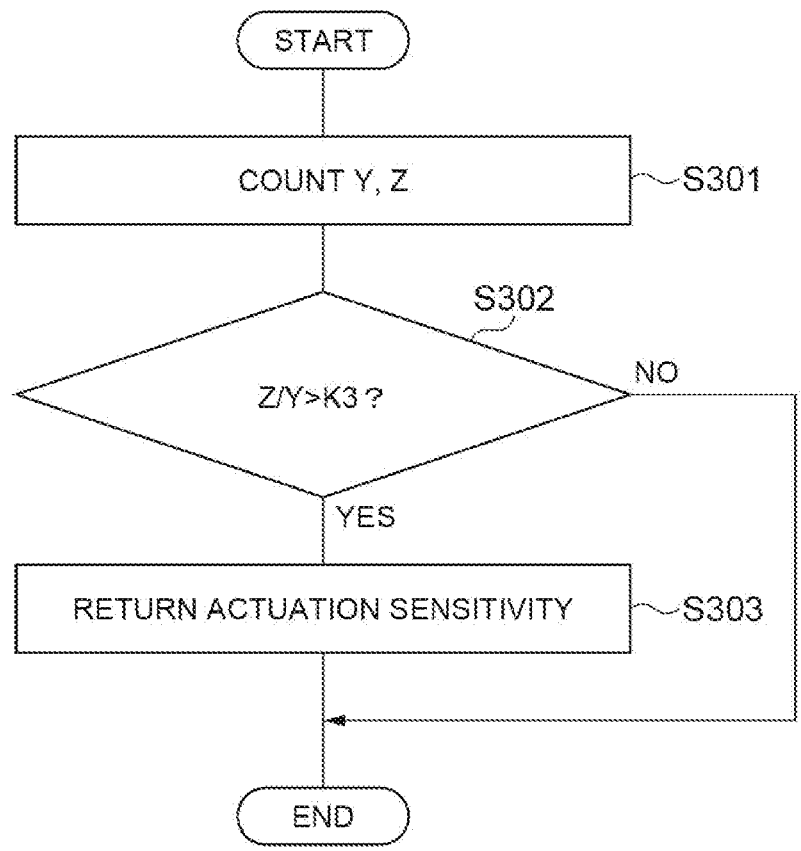
FIG. 6 is a flowchart showing the flow of the process of changing the actuation sensitivity.

Next, a flow of the change processing of the actuation sensitivity performed in the driving support apparatus 1B will be described. The process illustrated in FIG. 6 is started after the actuation sensitivity is changed so that the deceleration control is easily executed (that is, after the process of S106 in FIG. 2 is executed). After changing the actuation sensitivity, the sensitivity setting unit 13B counts the control execution count (Y) and the accelerator override count (Z) (S301). Here, the sensitivity setting unit 13B counts the control execution count (Y) and the accelerator override count (Z) for a predetermined collection criterion such as a predetermined time.

Next, in the sensitivity setting unit 13B, it is determined whether the accelerator override count (Z) and the like satisfy the above-described formula (4) "Z/Y>K3" (S302). When the formula (4) is satisfied (S302: YES), the sensitivity setting unit 13B returns the changed actuation sensitivity to the state before the change (S303). On the other hand, if the formula (4) is not satisfied (S302: NO), the sensitivity setting unit 13B maintains the actuation sensitivity changed in the processing of S106 in FIG. 2.

As described above, the driving support apparatus 1B restores the changed actuation sensitivity based on the occurrence frequency of the accelerator override after the actuation sensitivity is changed. As a result, the driving support apparatus 1B can execute driving support more suitable for the characteristics of the driver.

Note that the configuration for restoring the actuation sensitivity described in the third embodiment may be applied to the driving support apparatuses according to the first and second embodiments described above and modifications described below.

First Modification

As a first modification, for example, the driving support apparatus 1 according to the first embodiment described above may count the driver operation count (X) and the control execution count (Y) (the processing of the S103 in FIG. 2) when the host vehicle is traveling on a general road. The driving support apparatus 1 can determine whether or not the host vehicle is traveling on a general road based on the map information of the navigation system, the vehicle position information, and the like. Then, the driving support apparatus 1 may determine a change in the actuation sensitivity (processing after S104 in FIG. 2) based on the driver operation count (X) and the control execution count (Y).

For example, in expressway, scenes in which deceleration control by the deceleration execution unit 11 is executed are limited due to the absence of traffic light, the absence of pedestrian, and the like as compared with general roads. Therefore, the driving support apparatus 1 performs the change process of the actuation sensitivity using the driver operation count (X) or the like counted during traveling on a general road on which the number of scenes in which the deceleration control is executed is larger than that of the expressway. Thus, the driving support apparatus 1 can change the actuation sensitivity so as to be more suitable for the characteristics of the driver.

The driving support apparatus 1 may change the actuation sensitivity by counting the driver operation count (X) or the like while the host vehicle is traveling on the expressway. In this case, the driving support apparatus 1 can set the actuation sensitivity for expressway suitable for driving support during traveling on expressway. In addition, the change of the actuation sensitivity based on the type of the road may be applied to the driving support apparatus according to the second embodiment and other modifications.

Second Modification

As a second modification, for example, the driving support apparatus 1 according to the first embodiment described above may change the actuation sensitivity when the change in the ratio of the control execution count (Y) converges within a certain value. More particularly, the driving support apparatus 1, after it has been determined in the process of S104 in FIG. 2 that the formula (1) "Y/(X+Y)≤K1" is satisfied (S104: YES), monitors the fluctuation of the ratio "Y/(X+Y)" of the control execution count (Y). When the fluctuation of the ratio of control execution count (Y) converges within a fixed value, the driving support apparatus 1 performs the processing after S105 in FIG. 2.

In this case, the driving support apparatus 1 can change the actuation sensitivity in a running state in which the fluctuation of the ratio of the control execution count (Y) is stable. The timing of changing the actuation sensitivity may be applied to the driving support apparatus according to the second embodiment and other modifications.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A driving support apparatus for performing a deceleration control of a vehicle, comprising:
 a sensitivity setting unit configured to set an actuation sensitivity of the deceleration control;
 a deceleration execution unit configured to execute the deceleration control based on the actuation sensitivity; and
 a brake operation detection unit configured to detect a brake operation by a driver of the vehicle,
 wherein the sensitivity setting unit changes the actuation sensitivity based on a control execution count, which is a number of times the deceleration control has been executed by the deceleration execution unit, and a driver operation count, which is a number of times the brake operation has been detected by the brake operation detection unit.

2. The driving support apparatus of claim 1, wherein the sensitivity setting unit changes the actuation sensitivity such that the deceleration control by the deceleration execution unit is easily executed when a ratio of the control execution count to a sum of the control execution count and the driver operation count is equal to or less than a first threshold.

3. The driving support apparatus according to claim 1, wherein the sensitivity setting unit calculates a brake override count which is the number of brake operations performed by the driver during the deceleration control, based on an execution state of the deceleration control by the deceleration execution unit and a detection result of the brake operation detection unit, and further changes the actuation sensitivity based on the number of brake overrides.

4. The driving support apparatus of claim 3, further comprising a scene determination unit configured to determine, based on at least one of a traveling state of the vehicle and a surrounding environment of the vehicle, whether or not a brake override necessary scene in which the brake operation by the driver is necessary during execution of the deceleration control by the deceleration execution unit,
 wherein the sensitivity setting unit calculates a total brake count, which is a total number of times a brake of the vehicle is actuated based on the control execution count, the driver operation count, and the brake override count, calculates a necessary scene brake count, which is the number of times the brake override is performed during the brake override necessary scene, and changes the actuation sensitivity to easy execution of the deceleration control by the deceleration execution unit when a ratio of the number of times obtained by subtracting the necessary scene brake count from the control execution count to the total brake count is equal to or less than a second threshold.

5. The driving support apparatus according to claim 1, further comprising an accelerator operation detection unit configured to detect an accelerator operation by the driver,
 wherein the sensitivity setting unit determines presence or absence of an accelerator override in which the accelerator operation is performed by the driver while the deceleration control is being executed based on an executing state of the deceleration control by the deceleration execution unit and a detection result of the accelerator operation detection unit, and returns the actuation sensitivity to a state before the change when an occurrence frequency of the accelerator override with respect to the control execution count increases to exceed a predetermined third threshold before and after the actuation sensitivity is changed.

* * * * *